United States Patent Office 3,360,089
Patented Dec. 26, 1967

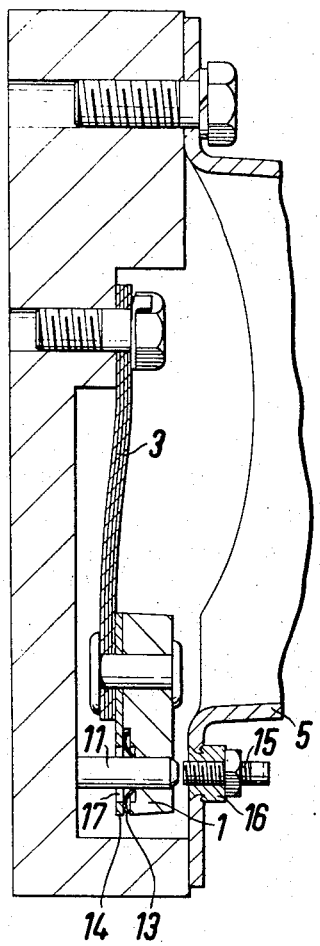
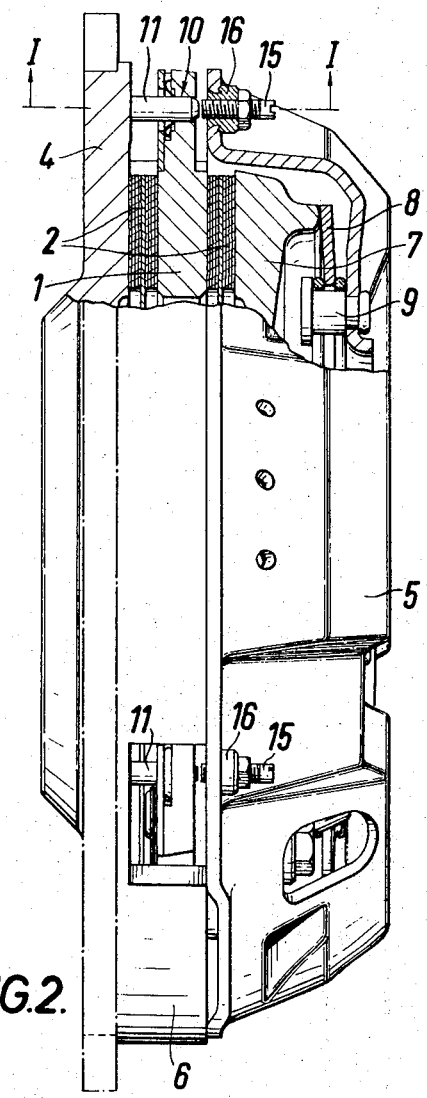
FIG.1.
FIG.2.

3,360,089
MULTIPLE DISC CLUTCH WITH WEAR COMPENSATOR
Bryan J. Cockerill and Ian M. Scholfield, Leamington Spa, England, assignors to Automotive Products Company Limited, Leamington Spa, England, a British company
Filed Aug. 3, 1965, Ser. No. 476,880
Claims priority, application Great Britain, Aug. 24, 1964, 26,161/64
6 Claims. (Cl. 192—111)

ABSTRACT OF THE DISCLOSURE

The present invention relates to an automatic adjuster for a twin plate clutch in which an intermediate pressure plate is provided with pin means extending therethrough and with a friction member surrounding the pin means and carried by the intermediate pressure plate for movement therewith. Abutment means are provided adjacent each end of the pin means to provide stops to cause adjustment of the pin means relative to the intermediate pressure plate to compensate for wear of the friction elements of the clutch.

---

This invention relates to an automatic adjusting device for a twin plate clutch incorporating a strap drive the device operating automatically to compensate for wear of the friction elements.

According to the invention an automatic adjuster for a twin plate clutch comprises a pin mountable on the intermediate pressure plate of the clutch so as to be slidable along an axis parallel to the axis of rotation of the clutch, a friction member surrounding the pin shank and associated with the intermediate pressure plate so as to be movable therewith and an abutment disposed adjacent each end of the pin, one of said abutments providing a stop determining the intermediate position of the intermediate pressure plate the other providing a stop for causing adjustment of the pin relative to the intermediate pressure plate and friction member said abutments being spaced so that upon any movement of the intermediate pressure plate in excess of the predetermined movement required for clutch engagement and resulting from wear in the friction elements the pin is caused to slide through the intermediate pressure plate relative to the friction member by contact of one end of the pin with the adjacent abutment forming said second mentioned stop by an amount corresponding to said excess movement to maintain the other end of the pin in a predetermined position relative to the abutment forming said first mentioned stop adjacent said other end of the pin. The friction member can be in the form of a spring steel washer having radial tongues extending inwards to the central hole, the tongues permitting the axial sliding movement of the pin relative to the washer in one direction only relative axial movement in the opposite direction being prevented by the frictional grip created by flexing of the tongues resulting from any tendency for the pin to move in such opposite direction. Advantageously the abutment stop determining the intermediate position of the intermediate pressure plate is adjustable so that initial predetermined adjustment of the clutch can be effected.

An embodiment of the invention will now be described by way of example with the aid of the accompanying drawings in which FIGURE 1 is a section on the line I—I of FIGURE 2 this latter figure being a side view, partly in section of the clutch.

Referring to the drawings, particularly FIGURE 2, the twin plate clutch comprises an intermediate pressure plate 1 having on either side thereof clutch plates 2 each provided with the usual friction linings on opposite faces. The intermediate pressure plate 1 is coupled in the usual manner through strap drives 3, one of which is shown in FIGURE 1, to the clutch driving member 4, for example the flywheel of an internal combustion engine. A clutch cover 5 is disposed on the side of the intermediate pressure plate 1 opposite to the clutch driving member 4 and is held in spaced relationship to said driving member by a spacing ring 6 surrounding the periphery of the intermediate pressure plate 1. In the drawing the spacing ring is shown as formed integral with the flywheel or other clutch driving member 4, but the same can be made as a separate component. A further pressure plate 7 is provided on the side of the intermediate pressure plate remote from the clutch driving member 4, clutch engagement being obtained by a dished spring or diaphragm spring 8 which is secured by rivets 9 to the clutch cover the spring 8 acting between the clutch cover and pressure plate 7 to effect clutch engagement. The intermediate pressure plate 1 has a hole 10 through the thickness thereof adjacent its peripheral edge the hole receiving a pin 11 which is an easy sliding fit in the hole the pin being slidable along an axis parallel to the axis of rotation of the clutch. The end of the hole facing the flywheel or other clutch driving member is counterbored, the counterbore providing a recess 12 to receive a spring steel washer 13 which surrounds the pin shank the washer being trapped in the recess 12 by a closure plate 14 which extends over the counterbore the said plate having a clearance hole 17 through which the pin extends. The spring steel washer 13 is provided with radially extending togues which extend to the central hole therein the tongues being formed so that the pin 11 can slide through the washer in a direction away from the flywheel or other clutch driving member the tongues frictionally gripping the pin to hold the same against movement in the opposite direction or towards the flywheel, relative to the washer.

The length of the pin 11 is such that the opposite ends project outwardly on either side of the intermediate pressure plate. The end of the pin projecting towards the clutch cover faces the inner end of a stud 15 screwed into a threaded nut 16 secured to the cover plate 5 the inner end of the stud providing an abutment forming a stop engageable by the appropriate end of the pin 11 to define the intermediate position of the intermediate pressure plate. The surface of the flywheel or other clutch driving member provides an abutment forming a stop engageable by the adjacent end of the pin.

During assembly of the clutch the pin 11 is arranged so that with the intermediate pressure plate 1 in the clutch disengaged position one end of the pin 11 engages the adjacent surface of the flywheel or other clutch driving member, the stud 15 being adjusted and locked in position to provide a predetermined clearance corresponding to the normal working stroke, between the inner end of the stud and the adjacent end of the pin. When the clutch is operated, the spring steel washer 13 moves with the intermediate pressure plate 1 relative to the pin 11 whereby the washer 13 is accurately positioned on the pin to correspond to the predetermined working stroke. When the clutch is disengaged the pin 11 moves jointly with the intermediate pressure plate 1 the appropriate end of the pin contacting the inner end of the stud 15 to position the intermediate member in the clutch disengaged position. When wear in the friction elements is sufficient to necessitate adjustment, the additional movement of the intermediate member 1 resulting from such wear will cause the appropriate end of the pin 11 to contact the face of the flywheel or other clutch driving member so that the pin will slide through the washer by an amount corresponding to the extra travel thus maintaining the opposite end of the pin in correct relation to the inner end of the stud. Conveniently, three adjusting devices are provided, equally spaced from one another, but any suitable number of such devices can be provided.

We claim:

1. An automatic adjuster for a twin plate clutch comprising a pin, an intermediate pressure plate, said pin being mounted on said plate for slidable movement along an axis parallel to the axis of rotation of the clutch, a friction member surrounding the pin and carried by the intermediate pressure plate for movement therewith and an abutment disposed adjacent each end of the pin, one of said abutments providing a stop determining the intermediate position of the intermediate pressure plate, the other abutment providing a stop for causing adjustment of the pin relative to the intermediate pressure plate and friction member, said abutments being spaced so that upon any movement of the intermediate pressure plate in excess of the predetermined movement required for clutch engagement and resulting from wear in the friction elements the pin is caused to slide through the intermediate pressure plate relative to the friction member by contact of one end of the pin with the adjacent abutment forming said second mentioned stop.

2. An automatic adjuster for a twin plate clutch comprising an intermediate pressure plate with an opening extending therethrough, an elongated pin slidably disposed in said opening along an axis parallel to the axis of rotation of the clutch, a friction member carried by said plate biased against the outer surface of said pin for normally holding said pin in a fixed position with respect to said plate, stud means disposed adjacent one side of said plate to provide a first stop for said pin, a flywheel disposed adjacent the other side of said plate to provide a second stop for said pin for causing axial adjustment of said pin with respect to said plate and friction member, complementary friction pad means disposed on one side of said plate adjacent said stud means, clutch engaging means for causing said friction pad means to engage each other and said plate to move toward said flywheel, said friction member being constructed to slide toward said flywheel and permit said pin to move in the opposite direction with respect to said friction member and said plate.

3. A clutch comprising a first pressure plate, with a flywheel disposed on one side thereof and a cover member on the opposite side, friction pads on opposite sides of said first pressure plate, a second pressure plate on the same side of said first pressure plate as said cover member, biasing means for forcing said second pressure plate against the friction pads on said first pressure plate, said first plate having a hole extending therethrough, a pin slidably disposed in said hole and extending beyond opposite sides of said first plate, a first stop on said cover member for one end of said pin and said flywheel acting as a second stop for the opposite end of said pin, and frictional grip means secured to said first plate and gripping the outer surface of said pin to permit it to slidably move toward said cover member only when it contacts said flywheel to compensate for wear of said friction pads.

4. An automatic adjuster according to claim 3 wherein the friction gripping means comprises a spring steel washer having radial tongues extending inwards to said hole, said tongues permitting the axial sliding movement of the pin relative to the washer in said one direction only, relative axial movement in the opposite direction being prevented by the frictional grip created by flexing of the tongues resulting from any tendency for the pin to move in such opposite direction.

5. An automatic adjuster according to claim 3 wherein said first stop which determines the intermediate position of the intermediate pressure plate is adjustable so that initial predetermined adjustment of the clutch can be effected.

6. An automatic adjuster according to claim 3 wherein the first stop comprises a stud screwed into a tapped hole in the clutch cover plate.

References Cited

UNITED STATES PATENTS

| 2,536,269 | 1/1951 | Driscoll | 192—111 |
| 3,086,634 | 4/1963 | Reed | 192—111 |
| 3,240,296 | 3/1966 | Gancel | 188—196 |

FOREIGN PATENTS

| 850,844 | 9/1952 | Germany. |

BENJAMIN W. WYCHE III, *Primary Examiner.*